(12) United States Patent
Kobayashi

(10) Patent No.: US 11,181,963 B2
(45) Date of Patent: Nov. 23, 2021

(54) INFORMATION PROCESSING DEVICE AND CONTROL METHOD FOR THE SAME

(71) Applicant: CANON KABUSHIKI KAISHA, Tokyo (JP)

(72) Inventor: Yo Kobayashi, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 29 days.

(21) Appl. No.: 16/663,238

(22) Filed: Oct. 24, 2019

(65) Prior Publication Data

US 2020/0133375 A1 Apr. 30, 2020

(30) Foreign Application Priority Data

Oct. 26, 2018 (JP) .............................. JP2018-202035

(51) Int. Cl.
G06F 1/32 (2019.01)
G06F 1/24 (2006.01)
G06F 1/3234 (2019.01)

(52) U.S. Cl.
CPC .............. *G06F 1/3234* (2013.01); *G06F 1/24* (2013.01)

(58) Field of Classification Search
CPC ................................ G06F 1/3234; G06F 1/24
See application file for complete search history.

(56) References Cited

U.S. PATENT DOCUMENTS

2002/0120843 A1* 8/2002 Goodman ............... G06F 21/57
713/164
2009/0313493 A1 12/2009 Ide

FOREIGN PATENT DOCUMENTS

| CN | 102006385 A | 4/2011 |
| CN | 103458145 A | 12/2013 |
| JP | 2010-262659 A | 11/2010 |

OTHER PUBLICATIONS

Unit definition, yourdictionary.com, retrieved from the internet at <https://www.yourdictionary.com/unit>, 13 pages (Year: 2007).*

* cited by examiner

*Primary Examiner* — Stefan Stoynov
(74) *Attorney, Agent, or Firm* — Canon U.S.A., Inc. IP Division

(57) ABSTRACT

An information processing device shifts to first and second power states and includes an output unit to output an operation stop signal, and a device to receive the operation stop signal and to shift to an operation stop state based on the operation stop signal, and to shift to an electric power saving mode where less power is consumed than in the operation stop state on condition that the operation stop signal has not been input. A signal control unit provides control that prevents the operation stop signal from being input to the device when the information processing device shifts to the second power state. The signal control unit controls the operation stop signal when a restart unit restarts the information processing device.

11 Claims, 15 Drawing Sheets

FIG.15
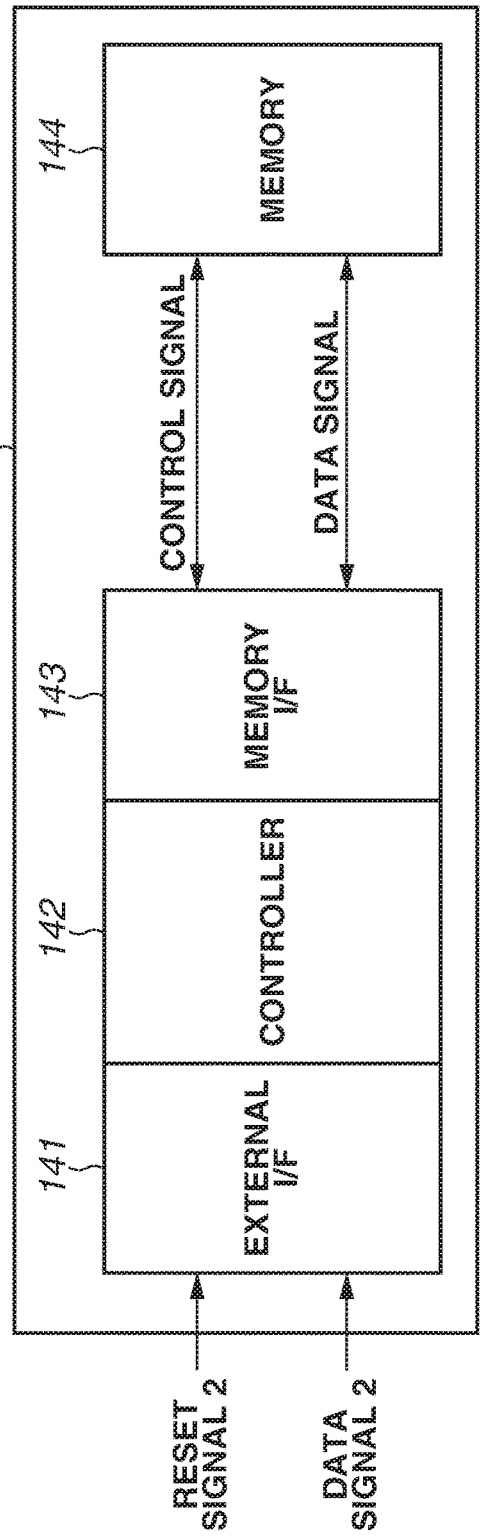
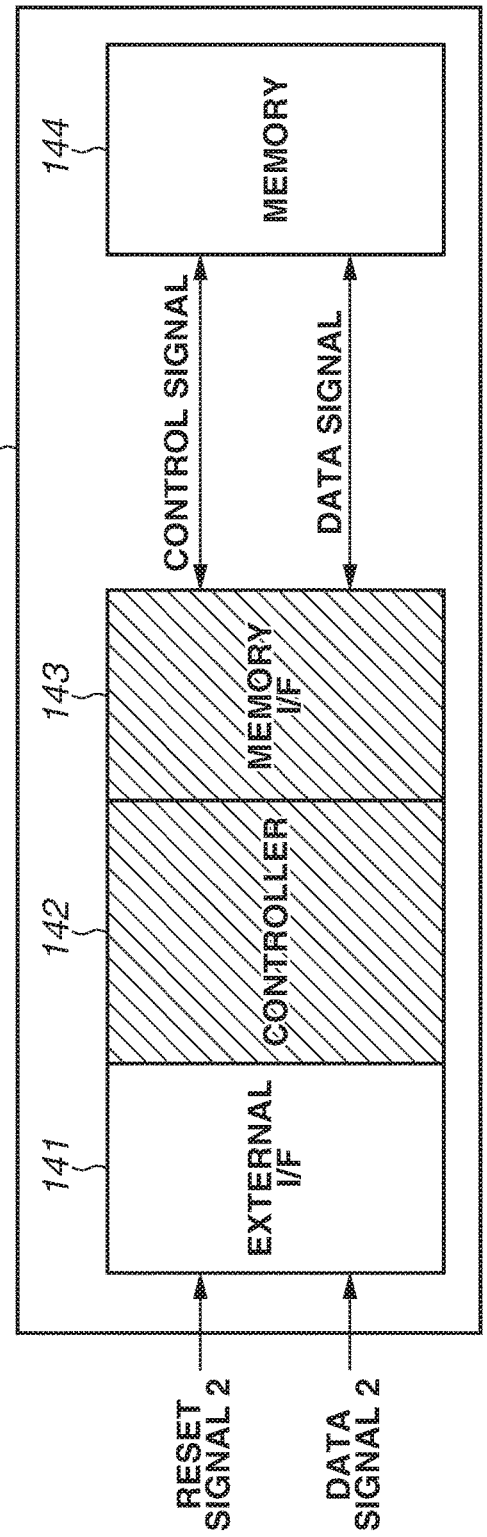

INFORMATION PROCESSING DEVICE AND CONTROL METHOD FOR THE SAME

BACKGROUND

Field

The present disclosure relates to an information processing device including a device configured to enter an operation stop state (reset state) based on an operation stop signal (reset signal) and to shift from the operation stop state to a power saving mode, that consumes less power than in operation stop state, at least under the condition where no operation stop signal has been input.

Description of the Related Art

As to information processing devices, such as printers, scanners, personal computers, tablets, and smartphones, there is demand for further reduction in power consumption even in a power saving state. Reasons for this demand include compliance with the environmental regulations in each country, reduction in the total running cost borne by an end user, and prolongation of the battery drive time.

For example, in Japanese Patent Application Laid-Open No. 2010-262659, when a computer shifts to an electric power saving state, a southbridge outputs a reset signal to stop operation of peripheral devices of the southbridge. Since the various operations of the peripheral devices are stopped thereby, the power consumption by the peripheral devices is reduced.

Some peripheral devices automatically shift to an electric power saving mode even if no reset signal has been input. For example, an embedded Multi-Media Card (eMMC) allows reduction in power consumption by shutting off power to a part of the internal portion of the eMMC itself at least under the condition that no reset signal has been input.

A host (central processing unit (CPU)) of the peripheral devices generally outputs a reset signal to the peripheral devices when the information processing device shifts to a power saving state. The reset signal is then input to the peripheral device. The peripheral device enters an operation stop state, and power consumption by the peripheral device is reduced thereby.

SUMMARY

The power consumption of the eMMC in the electric power saving mode, as described above, is smaller than that in the operation stop state caused by the reset signal. In other words, when the information processing device shifts to electric power saving state, the reset signal is input to peripheral devices, such as the eMMC, and the operation shifts to the operation stop state. As a result, the power consumption is higher than the power consumption in a case where the eMMC shifts to the electric power saving mode. To solve the issue, there exists a technique for providing a mask circuit to prevent input of a reset signal to the peripheral devices when the information processing device shifts to the electric power saving state.

There is also a technique for restarting the information processing device by detecting failure of a device, such as a CPU. The information processing device is restarted if a device that is the source of the reset signal breaks down while the mask circuit is masking the reset signal to the eMMC. During this restarting, however, the mask circuit is masking the reset signal to the eMMC, so that no reset signal is input to the eMMC.

The present disclosure features an information processing device including a unit configured to mask an operation stop signal to be output to a device such as an eMMC, wherein the unit controls the operation stop signal to be input to the device such as the eMMC when the information processing device is restarted.

According to an aspect of the present disclosure, an information processing device shifts to at least a first power state and a second power state where less power is consumed than in the first power state. The information processing device includes an output unit configured to output an operation stop signal, a device configured to receive the operation stop signal output from the output unit, and to shift to an electric power saving mode where less power is consumed than in the operation stop state at least on condition that the operation stop signal has not been input. The information processing device further includes a signal control unit configured to provide control that prevents the operation stop signal from being input to the device when the information processing device shifts to the second power state, and a restart unit configured to restart the information processing device based on a specified condition. The signal control unit controls the operation stop signal to be input to the device when the restart unit restarts the information processing device.

Further features of the present disclosure will become apparent from the following description of exemplary embodiments with reference to the attached drawings.

BRIEF DESCRIPTION OF THE DRAWINGS

FIG. 15 is a diagram illustrating an operation stop state and an electric power saving mode of the nonvolatile memory.

DESCRIPTION OF THE EMBODIMENTS

Various exemplary embodiments of the present disclosure will be described in detail with reference to the drawings.

In the present exemplary embodiments, an image forming device including a print function and a scan function is described as an example of the information processing device.

Figure 1:
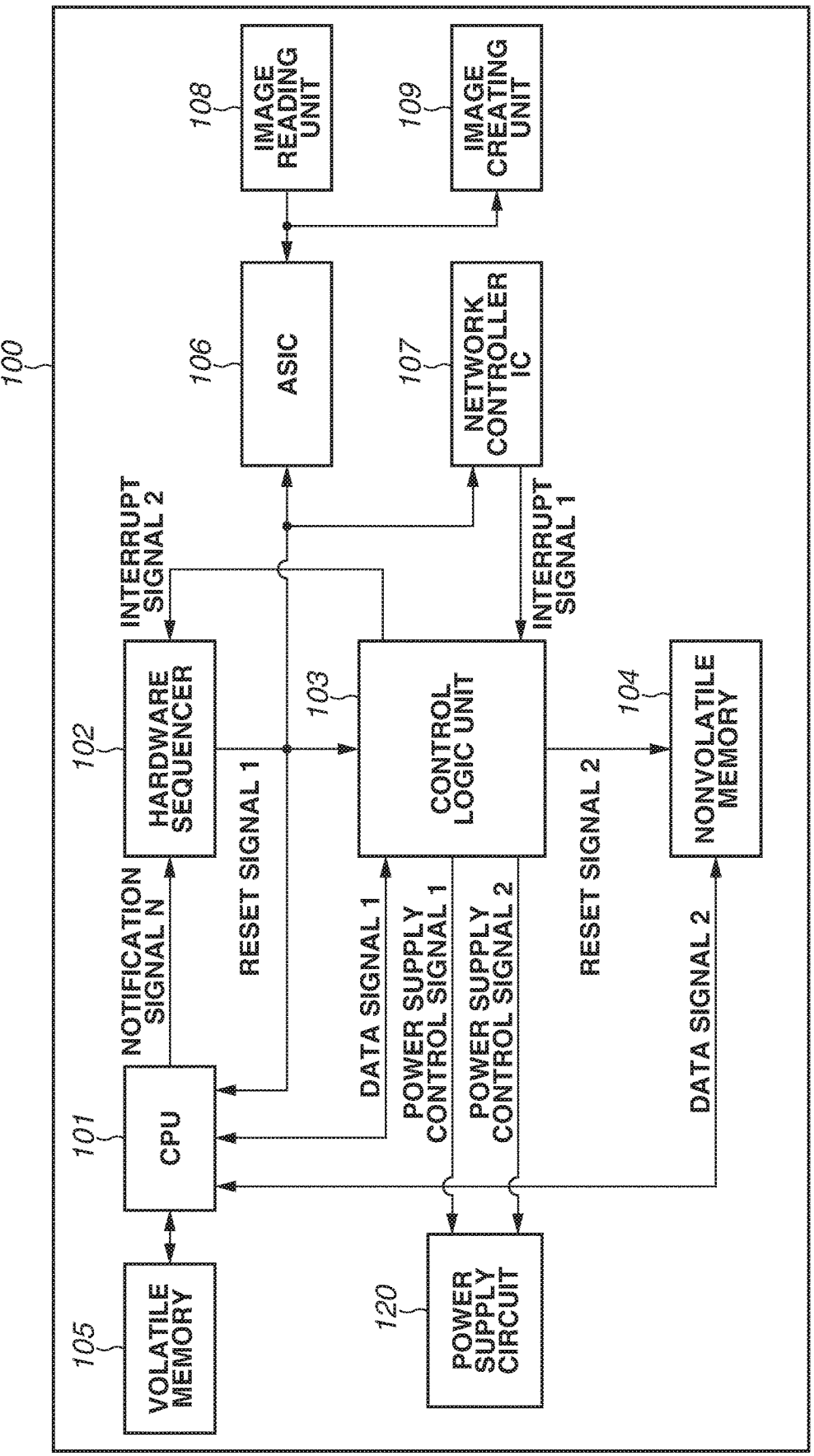
FIG. 1 is a diagram illustrating a hardware configuration of an image forming device according to a first exemplary embodiment.
Figure 2:
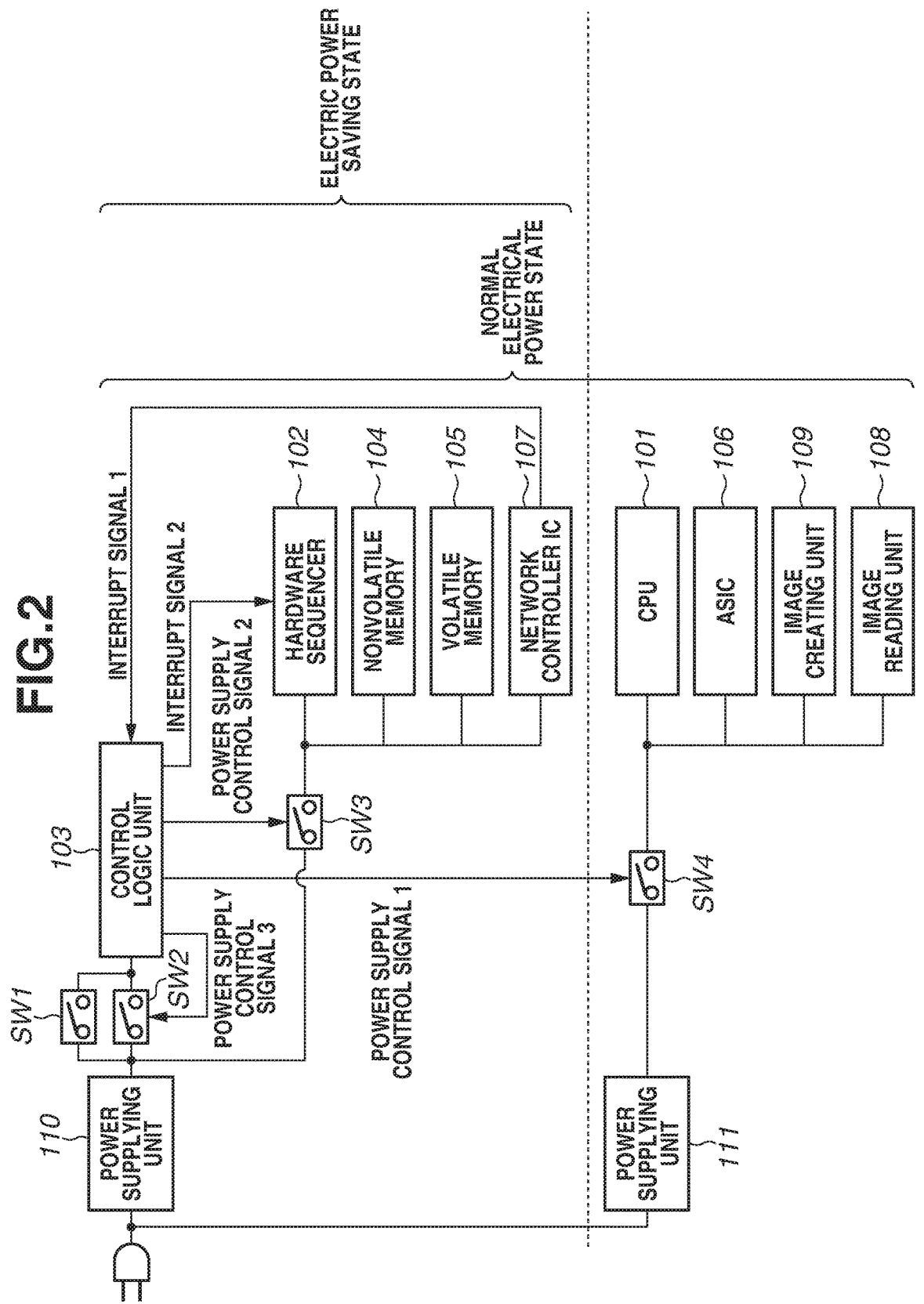
FIG. 2 is a diagram illustrating a power supply system of an image forming device.

The first exemplary embodiment will be described below. FIG. 1 is a diagram illustrating a hardware configuration of an image forming device 100. FIG. 2 is a diagram illustrating a power supply system of the image forming device 100.

The image forming device 100 includes a central processing unit (CPU) 101, a hardware sequencer 102, a control logic unit 103, a nonvolatile memory 104, and a volatile memory 105. The image forming device 100 further includes an application specific integrated circuit (ASIC) 106, a network controller integrated circuit (IC) 107, an image reading unit (reading unit) 108, and an image creating unit (printing unit) 109. The image forming device 100 further includes a power supply circuit 120.

The CPU (arithmetic unit) 101 utilizes the volatile memory 105 as its work space memory. The CPU 101 executes programs stored in the nonvolatile memory 104 to perform various processes. The CPU 101 can access devices connected to CPU 101 (for example, the nonvolatile memory 104).

The CPU 101 outputs a notification signal N indicating the power state of the image forming device 100. This notification signal N indicates the power state to which the image forming device 100 will shift to next. Specifically, the image forming device 100 outputs a notification signal N indicating a normal electrical power state when the CPU 101 next shifts to the normal electrical power state. Also, the CPU 101 outputs a notification signal N indicating a power saving state when the image forming device 100 next shifts to the power saving state where the power consumption is less than that in the normal electrical power state. In addition, the CPU 101 outputs a notification signal N indicating a power-off state when the image forming device 100 next shifts to the power-off state. These notification signals N are input to the hardware sequencer 102.

The CPU 101 receives a reset signal (operation stop signal) 1. If the reset signal 1 is active, the CPU 101 enters a reset state in which operation is stopped (operation stop state). If the reset signal 1 is inactive, the CPU 101 enters a reset cancel state (operation ready state) in which operation is executable. Less power is consumed in the operation stop state than in the operation ready state. The CPU 101 cannot execute the program while in operation stop state.

The hardware sequencer 102 outputs a reset signal 1. The hardware sequencer 102 sets the reset signal 1 to active when the notification signal N received from the CPU 101 indicates the electric power saving state. The hardware sequencer 102 also sets the reset signal 1 to active when the notification signal N received from the CPU 101 indicates the power-off state. The hardware sequencer 102 sets the reset signal 1 to inactive when the notification signal N received from the CPU 101 indicates the normal electrical power state. The hardware sequencer 102 also receives an interrupt signal 2. The hardware sequencer 102 sets the reset signal 1 to inactive upon detection of an edge of the interrupt signal 2.

When the image forming device 100 is in the electric power-saving state or the power-off state, the hardware sequencer 102 reduces the power consumption of peripheral devices by causing the peripheral devices to shift to an operation stop state. The peripheral devices are the CPU 101, the ASIC 106, and the network controller IC 107.

The reset signal 1 according to the first exemplary embodiment is active at a low level and is inactive at a high level. In order to reset the peripheral devices, the hardware sequencer 102 drives the reset signal 1 to the low level. The logic of the reset signal 1 may be set to be active at the high level and inactive at the low level.

The notification signal N is output from CPU 101 to the hardware sequencer 102 via a signal line that is a 1-bit signal line. The signal pattern of the notification signal N indicates the power state. The signal line may also be a multi-bit signal line. The CPU 101 and the hardware sequencer 102 may be integrated into the same IC.

The control logic unit 103 controls power of each device in the image forming device 100. The control logic unit 103 receives the reset signal 1, the data signal 1, and the interrupt signal 1. The data signal 1 is output through from the CPU 101 to the control logic unit 103 via a data signal line. The data signal 1 is a signal indicating the power state of the image forming device 100. This data signal line 1 indicates the power state that the image forming device 100 will shift to next. The control logic unit 103 includes a power supply control register. The power state indicated by the data signal 1 is set in the power supply control register. In other words, the CPU 101 sets the power state that the image forming device 100 shifts to next, in the power supply control register via the data signal line. In the present exemplary embodiment, the control logic unit 103 outputs the reset signal (operation stop signal) 2 to the nonvolatile memory 104 based on the value set in the power supply control register. A value of any of the normal electrical power state, the electric power saving state, and the power-off state is set in the power supply control register.

Here, the power state of the image forming device 100 will be described in detail. The normal electrical power state is, for example, a state in which printing is being executed and the image creating unit 109 is operating. The normal electrical power state also means a state in which reading is being executed and the image reading unit 108 is operating. In the first exemplary embodiment, the image forming device 100 shifts to a standby state after printing is completed or after reading is completed. The power value in the normal electrical power state can vary widely, so that, here, the state in which printing or reading is being executed and the standby state are both defined as the normal electrical power state, despite that the power consumption in the state in which printing or reading is being executed is greater than that in the standby state. More power is consumed in the normal electrical power state than in the electric power saving state and the power-off state.

The electric power saving state is a state that the image forming device 100 shifts (or transitions) to when the image forming device 100 receives no operation from the user for a certain period of time in the above-described standby state or receives no print job via the network. In the electric power saving state, power to the CPU 101, the ASIC 106, the image reading unit 108 and the image creating unit 109 is stopped. In the electric power saving state, power is supplied to the volatile memory 105 so that the CPU 101 can immediately execute the program. In the electric power saving state, power is also supplied to the network controller IC 107 so that print jobs can be received via the network.

In the power-off state, power is supplied only to the power supplying unit 110 of the image forming device 100. When a power switch SW1 (illustrated in FIG. 2) provided on the image forming device 100 is pressed, power is supplied to each unit of the image forming device 100, and the power state of the image forming device 100 is shifted to the normal electrical power state. When the power switch SW1 is pressed in the normal electrical power state and in the electric power saving state, the power state of the image forming device 100 is shifted to the power-off state. This process is configured such that power supply is not immediately stopped when the power switch SW1 is pressed. After a shutdown process including an application termination process and operating system (OS) termination process is executed, the power state of the image forming device 100 is shifted to the power-off state.

The control logic unit 103 outputs the reset signal 1 output from the hardware sequencer 102 as a reset signal 2 based on the value in the power supply control register. Specifically, the control logic unit 103 sets the reset signal 2 to active when the value in the power supply control register indicates the normal electrical power state. In other words, the control logic unit 103 does not mask the reset signal 1 when the value in the power supply control register indicates the normal electrical power state. Also, the control logic unit 103 sets the reset signal 2 to active when the value in the power supply control register indicates the power-off state. In other words, the control logic unit 103 does not mask the reset signal 1 if the value in the power supply control register indicates the power-off state.

In the present exemplary embodiment, the control logic unit (signal control unit) 103 sets the reset signal 2 to inactive when the value in the power supply control register indicates the electric power saving state. In other words, the control logic unit 103 masks the reset signal 1 if the value in the power supply control register indicates the power-off state. When the image forming device 100 shifts to the electric power saving state, the control logic unit 103 sets the reset signal 2 to inactive even if the reset signal 1 is set active.

The control logic unit 103 outputs the interrupt signal 2. The interrupt signal 2 is input to the hardware sequencer 102. When the hardware sequencer 102 resets the reset signal 1 to inactive (high) upon detection of the edge of the interrupt signal 2. For example, when the network controller IC 107 receives a wake-up packet via the network while the image forming devices 100 is in the electric power saving state, the network controller IC 107 outputs the interrupt signal 1. The control logic unit 103 outputs the interrupt signal 1 when the edge of the interrupt signal 2 is detected. The hardware sequencer 102 resets the reset signal 1 to inactive when the edge of the interrupt signal 2 is detected. The CPU 101 accordingly enters the reset cancel state, so that the CPU 101 can execute the program.

The control logic unit 103 outputs a power supply control signal 1 and a power supply control signal 2 to the power supply circuit 120. The power supply control signal 1 and the power supply control signal 2 control power to be supplied from the power supply circuit 120.

Figure 14:
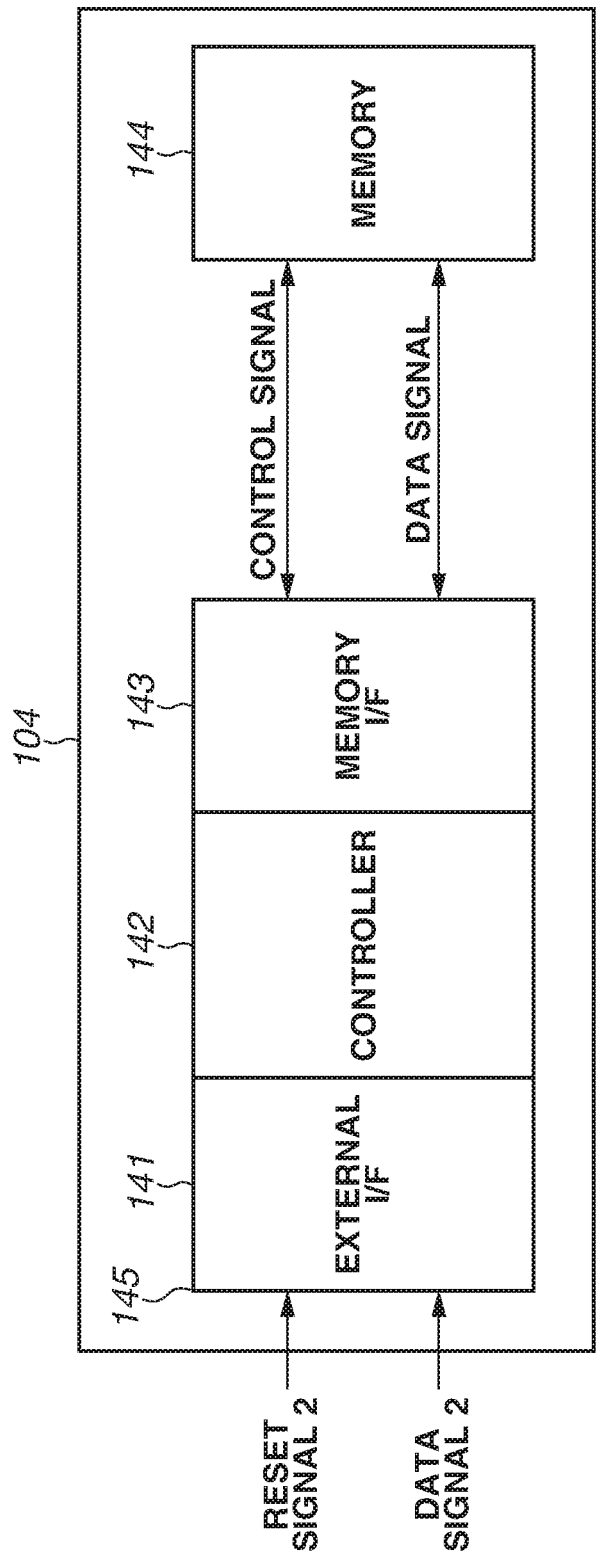
FIG. 14 is a block diagram of a nonvolatile memory.

Examples of the nonvolatile memory 104 includes an embedded Multi-Media Card (eMMC). As illustrated in FIG. 14, the nonvolatile memory 104 includes a memory (NAND Flash memory) 144, a memory controller 145 that writes data on the memory 144 and reads data from the memory 144, and a cache (not illustrated). The memory controller 145 includes an external interface (I/F) 141, a controller 142, and a memory interface (I/F) 143.

The nonvolatile memory 104 stores the OS of the image forming device 100 and a boot loader for loading the OS into the volatile memory 105. The nonvolatile memory 104 shifts to the electric power saving mode (auto power saving mode) at least under the condition that the reset signal (reset signal 2 in the present exemplary embodiment) is not input (inactive, high). Specifically, the nonvolatile memory 104 shifts to the electric power saving mode under the conditions that there is no access from the CPU 101 for a predetermined period after the end of processing based on a command from the CPU 101, and that no reset signal is input. In the present exemplary embodiment, the nonvolatile memory 104 is an eMMC. However, the nonvolatile memory 104 is not limited to an eMMC as long as it is capable of receiving a reset signal, and including a function to automatically shift to an electric power saving mode at least under the condition that no reset signal is input.

The nonvolatile memory 104 receives the reset signal 2 by the external I/F 141. The external I/F 141 also receives the data signal 2. The controller 142 writes the data into the memory 144 via the memory I/F 143 based on the data signal 2 (write command). The controller 142 also reads out the data from the memory 144 via the memory I/F 143 based on the data signal 2 (read command).

The nonvolatile memory 104 can shift to the operation stop state and the electric power saving mode illustrated in FIG. 15. When the reset signal 2 is input to the external I/F 141, the nonvolatile memory 104 shifts to the operation stop state. The nonvolatile memory 104 also shifts to the electric power saving mode under the conditions that the processing based on the command sent from the CPU 101 is ended, there is no access from the CPU 101 for a predetermined time, and there is no input of the reset signal 2. If the nonvolatile memory 104 enters the reset state (operation stop state), the controller 142 is in such a state where the program is inexecutable and the power consumption is decreased compared to the power consumption in the normal state. Also, if the nonvolatile memory 104 enters the electric power saving mode, the controller 142 shifts to the electric power saving mode where less power is consumed than in the operation stop state.

In the electric power saving mode, the supply of power to a power supply domain that is a portion of the nonvolatile memory 104 is stopped. Specifically, in the electric power saving mode, the supply of power to the controller 142 and the memory I/F 143 is stopped. When a command is received, the nonvolatile memory 104 returns to the normal state from the electric power saving mode.

The OS, etc. stored in the nonvolatile memory 104 is loaded into the volatile memory 105. The volatile memory 105 is utilized as the work space memory for the CPU 101.

The ASIC 106 is a device that can communicate with the CPU 101 via a data line (not illustrated in the drawing). For example, the ASIC 106 performs image processing on input image data and encrypts data. The reset signal 1 is also input to the ASIC 106.

The network controller IC 107 is a device that communicates with an external device via a network such as a Local Area Network (LAN). When the network controller IC 107 receives a wake-up packet from the external device while the image forming device 100 is in the electric power saving state, the network controller IC 107 outputs the interrupt signal 1. When the control logic unit 103 detects an edge of the interrupt signal 1, the control logic unit 103 outputs the power supply control signal 1. In this way, power is supplied to the CPU 101, the ASIC 106, image creating unit 109, and image reading unit 108. In other words, the image forming device 100 shifts from the electric power saving state to the normal electrical power state. The network controller IC 107 communicates with the external device by a wired or wireless communication.

The image reading unit 108 irradiates light onto a document placed on a pressure plate or an auto document feeder (ADF) and receives reflected light using an image sensor. The image sensor outputs digital image data. The image data output from the image reading unit 108 is input to the ASIC 106. The ASIC 106 filters noise components of the image data and compresses and decompresses the image data. The ASIC 106 sends image data to the image creating unit 109 as necessary. The image creating unit 109 forms an image on a paper medium based on the image data using a toner.

The power supply circuit 120 is a circuit board having a power supplying unit that supplies power to each unit of the image forming device 100. The supply and the cutoff of power to be output from the power supply circuit 120 are controlled by the power supply control signal 1 and the power supply control signal 2 output from the power supply circuit 120.

The power supply circuit 120 includes a power supplying unit 110, a power supplying unit 111, the power switch SW1, and a switch SW2 provided in parallel with the power switch SW1 as illustrated in FIG. 2. The power supply circuit 120 further includes a switch SW3 which is turned on and off by the power supply control signal 2, and a switch SW4 which is turned on and off by the power supply control signal 1.

As illustrated in FIG. 2, the power supplying unit 110 supplies power to the hardware sequencer 102, the control logic unit 103, the nonvolatile memory 104, the volatile memory 105, and the network controller IC 107. The power supplying unit 110 is an ACDC converter. The power supplying unit 111 supplies power to the CPU 101, the ASIC 106, and the image creating unit 109, and the image reading unit 108. The power supplying unit 111 is also an ACDC converter. The control logic unit 103 changes the power state of the image forming device 100 by controlling the supplying and stopping of power supplied from the power supplying unit 110 and the power supplying unit 111. When the image forming device 100 is in the normal electrical power state, the control logic unit 103 turns on the switch SW3 and the switch SW4 to supply power to each unit of the image forming device 100. When the image forming device 100 shifts to the electric power saving state, the control logic unit 103 controls the power supply control signal 1 to turn off the switch SW4. Consequently, the supply of power to the CPU 101, the ASIC 106, the image creating unit 109, and the image reading unit 108 is stopped. When the image forming device 100 shifts to the power-off state, the control logic unit 103 controls the power supply control signal 1 and the power supply control signal 2 to turn off the switch SW3 and the switch SW4. As a result, the supply of power to the hardware sequencer 102, the nonvolatile memory 104, the volatile memory 105, the network controller IC 107, the CPU 101, the ASIC 106, the image creating unit 109, and image reading unit 108 is stopped. In addition, the control logic unit 103 controls the power supply control signal 3 to turn off the switch SW2, and the supply of power to the control logic unit 103 itself is also stopped. The image forming device 100 shifts to the power-off state when the power switch SW1 is turned off by a user.

The power switch SW1 is turned off when the user turns off the image forming device 100. As a result, the CPU 101 executes a termination process such as a shutdown process and the control logic unit 103 turns off the switch SW2, the switch SW3, and the switch SW4. When the user turns on the image forming device 100, the power switch SW1 is turned on. At this time, the switch SW2 arranged in parallel with the power switch SW1 is also turned on in conjunction with the power switch SW1.

Figure 3:
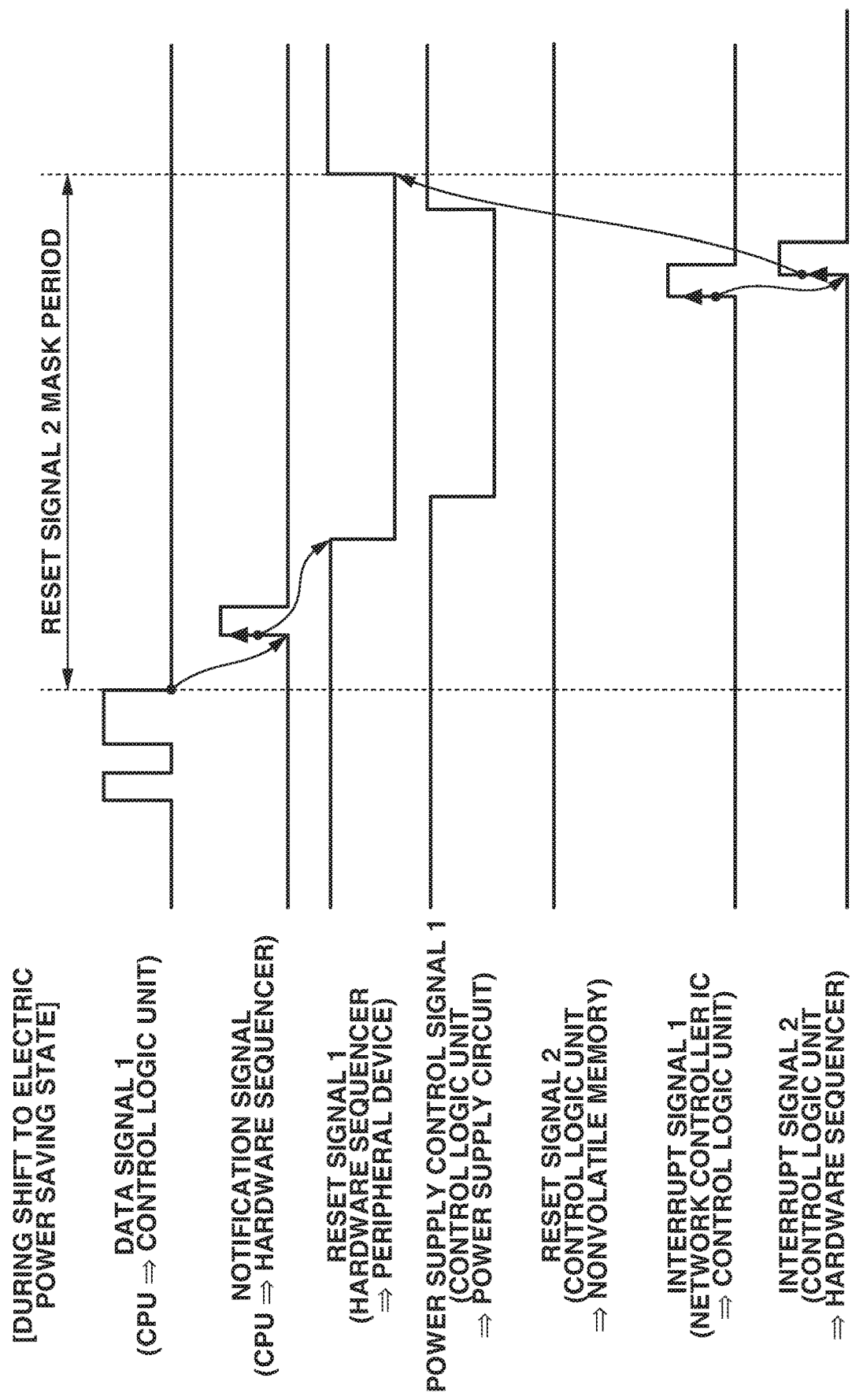
FIG. 3 is a timing chart of each signal when the image forming device shifts to a power-saving state.
Figure 4:
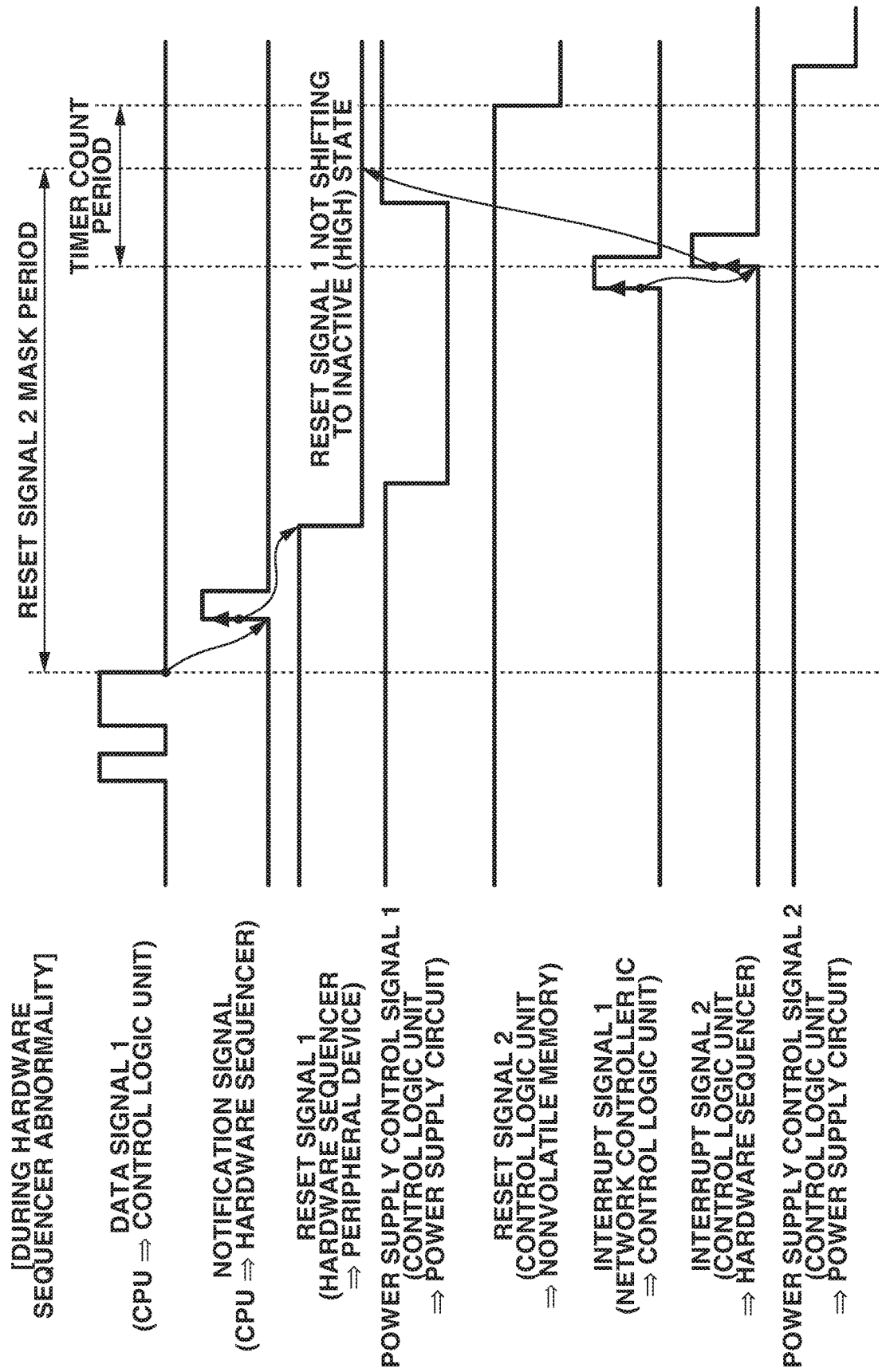
FIG. 4 is a timing chart of each signal when an abnormality occurs in a hardware sequencer.
Figure 5:
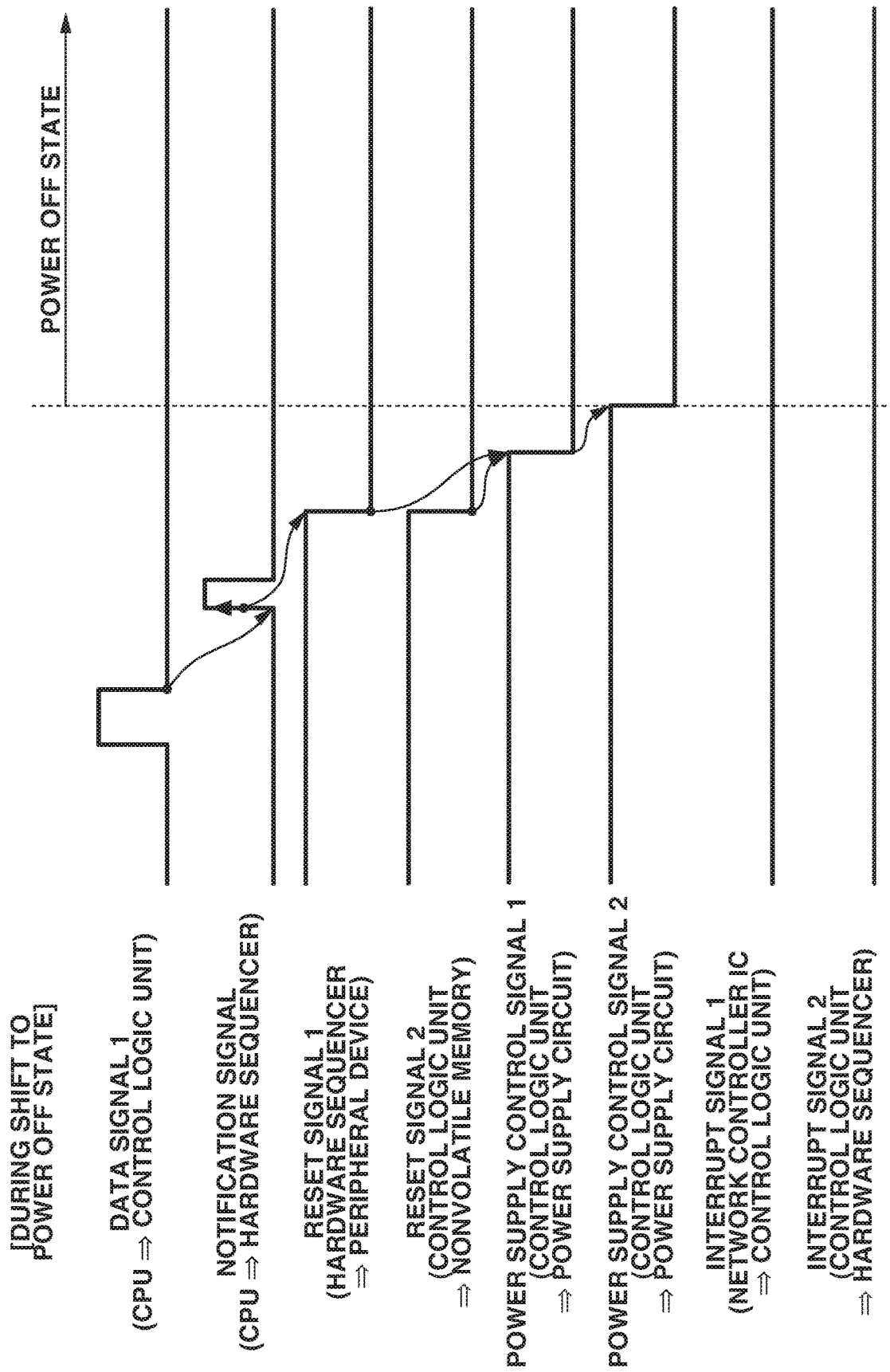
FIG. 5 is a timing chart of each signal when the image forming device shifts to a power-off state.

FIG. 3 is a timing chart of each signal when the image forming device 100 shifts to the electric power saving state. Each signal when the image forming device 100 shifts to the electric power saving state will be described with reference to FIG. 3. However, waveforms illustrated in the timing charts in FIGS. 3 to 5 are only examples, and do not limit the logic of the waveform or the signal of the waveform, whether an edge trigger or a level trigger, etc.

First, the CPU 101 outputs the data signal 1 indicating the power state (electric power saving state) to which the image forming device 100 shifts next. A value indicating the power state indicated by the data signal 1 is set in the power supply control register of the control logic unit 103.

Next, the CPU 101 that has output the data signal 1 outputs a pulse signal (notification signal N) indicating the electric power saving state to the hardware sequencer 102.

Upon detection of a rising edge of the notification signal N, the hardware sequencer 102 sets the reset signal 1 to active (low) in order to reset the peripheral devices. At this time, although the reset signal 1 input to the control logic unit 103 is also set to active (low), the control logic unit 103 does not set the reset signal 2 to active because the value in the power supply control register indicates the electric power saving state. In other words, the control logic unit 103 masks the reset signal 1 based on the value in the power supply control register. The reset signal 2 input to the nonvolatile memory 104 thus remains inactive. The reset signal 2 can accordingly be prevented from being input to the nonvolatile memory 104, when the image forming device 100 is in the electric power saving state. Consequently, the nonvolatile memory 104 shifts to the electric power saving mode (auto power saving mode) where less power is consumed than in the operation stop state.

When a predetermined period of time has elapsed since the reset signal 1 becomes active (low), the control logic unit 103 sets the power supply control signal 1 to the low level and changes the power state of the image forming device 100. When the power supply control signal 1 is set to the low level, the switch SW4 is turned off, and the supply of power to the CPU 101, the ASIC 106, the image creating unit 109, and the image reading unit 108 is stopped. Here, the predetermined period of time is a period for satisfying restrictions on the power supply sequence and the reset sequence of each unit included in the image forming device 100. In the present exemplary embodiment, the above-described restrictions on the power supply sequence and the reset sequence are satisfied by an internal timer provided in the control logic unit 103.

When the network controller IC 107 thereafter receives the wake-up packet while the image forming device 100 is in the electric power saving state, the network controller IC 107 outputs the interrupt signal 1. When the control logic unit 103 detects a rising edge of the interrupt signal 1, the control logic unit 103 outputs the interrupt signal 2, and sets the power supply control signal 1 to the high level. Then, when the hardware sequencer 102 detects the edge of the interrupt signal 2, the hardware sequencer sets the reset signal 1 to inactive (high).

In some cases, however, even though the control logic unit 103 outputs the interrupt signal 2 to the hardware sequencer 102, the hardware sequencer 102 may not set the reset signal 1 to inactive (high) due to an abnormal state of the hardware sequencer 102.

FIG. 4 is a timing chart for each signal when an abnormal state occurs in the hardware sequencer 102.

The control logic unit 103 according to the present exemplary embodiment monitors the state of the hardware sequencer 102. Specifically, the control logic unit 103 monitors the reset signal 1 output from the hardware sequencer 102 in order to monitor the state of the hardware sequencer 102. For example, the control logic unit 103 determines that the hardware sequencer 102 is abnormal if the reset signal 1 is not set to inactive (high) within a predetermined period of time after output of the interrupt signal 2. In the present exemplary embodiment, while the control logic unit 103 monitors the state of the hardware sequencer 102, a target to be monitored is not limited to the hardware sequencer 102. The control logic unit 103 may monitor the CPU 101, the ASIC 106, and the network controller IC 107.

The control logic unit 103 (restart unit) restarts the image forming device 100 if some of the devices in the image forming device 100 are in an abnormal state. Specifically, the control logic unit 103 restarts the image forming device 100 by turning on and turning off a switch (not illustrated) on the input side of each of a first power supplying unit and a second power supplying unit. In a case where the image forming device 100 is restarted while the reset signal to be input to the nonvolatile memory 104 is being masked, the supply of power to the nonvolatile memory 104 is stopped without resetting the nonvolatile memory 104. Generally, power to a device is cut off after resetting the nonvolatile memory 104 and then stopping the operation of the device. Elements may be physically destroyed and internal data may be logically destroyed without the foregoing processing. Although the start sequence including resetting of the nonvolatile memory 104 is specified in the nonvolatile memory 104, the specified start sequence is not executable if the control logic unit 103 masks the reset signal.

In the present exemplary embodiment, as illustrated in FIG. 4, the image forming device 100 is restarted after resetting the nonvolatile memory 104. To do so, in a case where the reset signal 1 does not become inactive (high) within a predetermined period of time after output of the interruption signal 2, the control logic unit 103 mandatorily sets the reset signal 2 to be input to the nonvolatile memory 104 to active (low). The control logic unit 103 then sets the power supply control signal 2 to the low level. With the above-described controls, the image forming device 100 can restart according to a normal startup sequence even if the hardware sequencer 102 is in an abnormal state. Consequently, the physical destruction of the nonvolatile memory 104 and logical destruction of the internal data can be prevented.

Although a start trigger for the control logic unit 103 to start counting a predetermined time is output of the interrupt signal 2 in the present exemplary embodiment, the start trigger for starting counting the predetermined time is not limited to the output of the interrupt signal 2. For example, the start trigger for the predetermined time may be input of the interrupt signal 1 that is output from the network controller IC 107.

FIG. 5 is a timing chart of each signal when the image forming device 100 shifts to the power-off state. Each signal when the image forming device 100 shifts to the power-off state will be described with reference to FIG. 5.

First of all, the CPU 101 outputs the data signal 1 indicating the power state (power-off state) to which the image forming device 100 next shifts. A value indicating the power state indicated by the data signal 1 is set in the power supply control register of the control logic unit 103.

Next, the CPU 101 that has output the data signal 1 outputs a pulse signal (notification signal N) indicating the power-off state to the hardware sequencer 102.

Upon detection of a rising edge of the notification signal N, the hardware sequencer 102 sets the reset signal 1 to active (low) in order to reset the peripheral devices. At this time, the reset signal 1 to be input to the control logic unit 103 is also set to active (low). The value in the power supply control register indicates the power-off state, so that the control logic unit 103 outputs the reset signal 2 based on the same logic (low) as the reset signal 1. In other words, the control logic unit 103 does not mask the reset signal 1 in a case where the value in the power supply control register indicates the power-off state. So the nonvolatile memory 104 can be reset before the image forming device 100 shifts to the power-off state. The interrupt signal 1 and the interrupt signal 2 are not output in the power-off state.

Then, when the reset signal 1 becomes active (low), the control logic unit 103 sequentially sets the power supply control signal 1 and the power supply control signal 2 to low to stop the supply of power from the power supplying unit 111 and to stop the supply of power from the power supplying unit 110.

Figure 6:
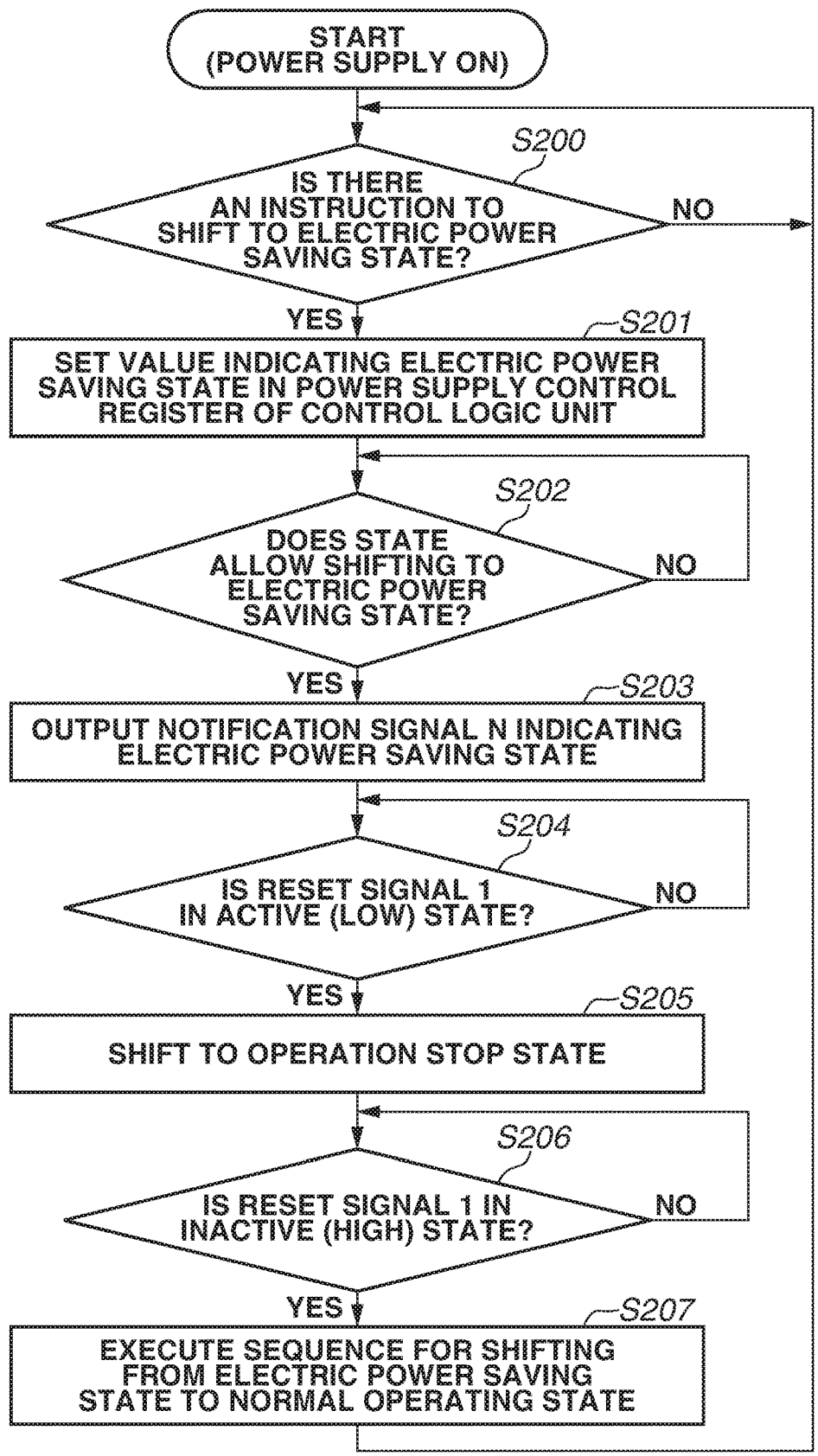
FIG. 6 is a flowchart illustrating processing executed by a central processing unit (CPU)

FIG. 6 is a flowchart illustrating processing executed by the CPU 101.

When the power switch SW1 is pressed, power is supplied to the hardware sequencer 102, and the hardware sequencer 102 then sets the reset signal 1 to inactive (high). The switch SW2 is turned on in conjunction with the power switch SW1. When the reset signal 1 becomes inactive (high), the CPU 101 sequentially executes the program and the OS, etc. stored in an address indicated by a reset vector. The image forming device 100 consequently shifts to the normal electrical power state.

In step S200, the CPU 101 waits for an instruction to shift to the electric power saving state from the OS in the normal electrical power state.

For example, if a certain period of time has passed without any operation of an operation unit (not illustrated) or a power saving button provided on the operation unit is pressed (Yes in step S200), the processing proceeds to step S201. In step S201, the CPU 101 sets a value indicating the electric power saving state in the power supply control register of the control logic unit 103.

In step S202, if the value indicating the electric power saving state is set in the power supply control register, the CPU 101 waits until shifting to the electric power saving state is executable in view of the process state of the program being executed. If shifting to the electric power saving state is executable (Yes in step S202), the processing proceeds to step S203. In step S203, the CPU 101 outputs the notification signal N indicating the electric power saving state to the hardware sequencer 102. In step S204, the CPU 101 determines whether the hardware sequencer 102 sets the reset signal 1 to active (low) based on the notification signal N indicating the electric power saving state. If the CPU 101 determines that the hardware sequencer 102 sets the reset signal 1 to active (low) and the CPU 101 is reset by the reset signal 1 (Yes in step S204), then in step S205, the CPU 101 enters the reset state (operation stop state).

For example, when the network controller IC 107 receives the wake-up packet, the interrupt signal 1 and the interrupt signal 2 are output. When the hardware sequencer 102 detects the edge of the interrupt signal 2, the hardware sequencer 102 sets the reset signal 1 to inactive (high). The reset of the CPU 101 is canceled, and the CPU 101 shifts from the reset state (operation stop state) to the reset cancel state (operation ready state). In step S206, the CPU 101 determines whether the reset signal 1 is set to inactive (high). When the reset signal 1 is set to inactive (high) (Yes in Step S206), then in step S207, the CPU 101 executes a recovery sequence that is different from the startup sequence and shifts to a state where the program is operable. The processing returns to step S200, and, the CPU 101 waits for an instruction to shift to the electric power saving state from the OS in the normal electrical power state (step S200).

Figure 7:
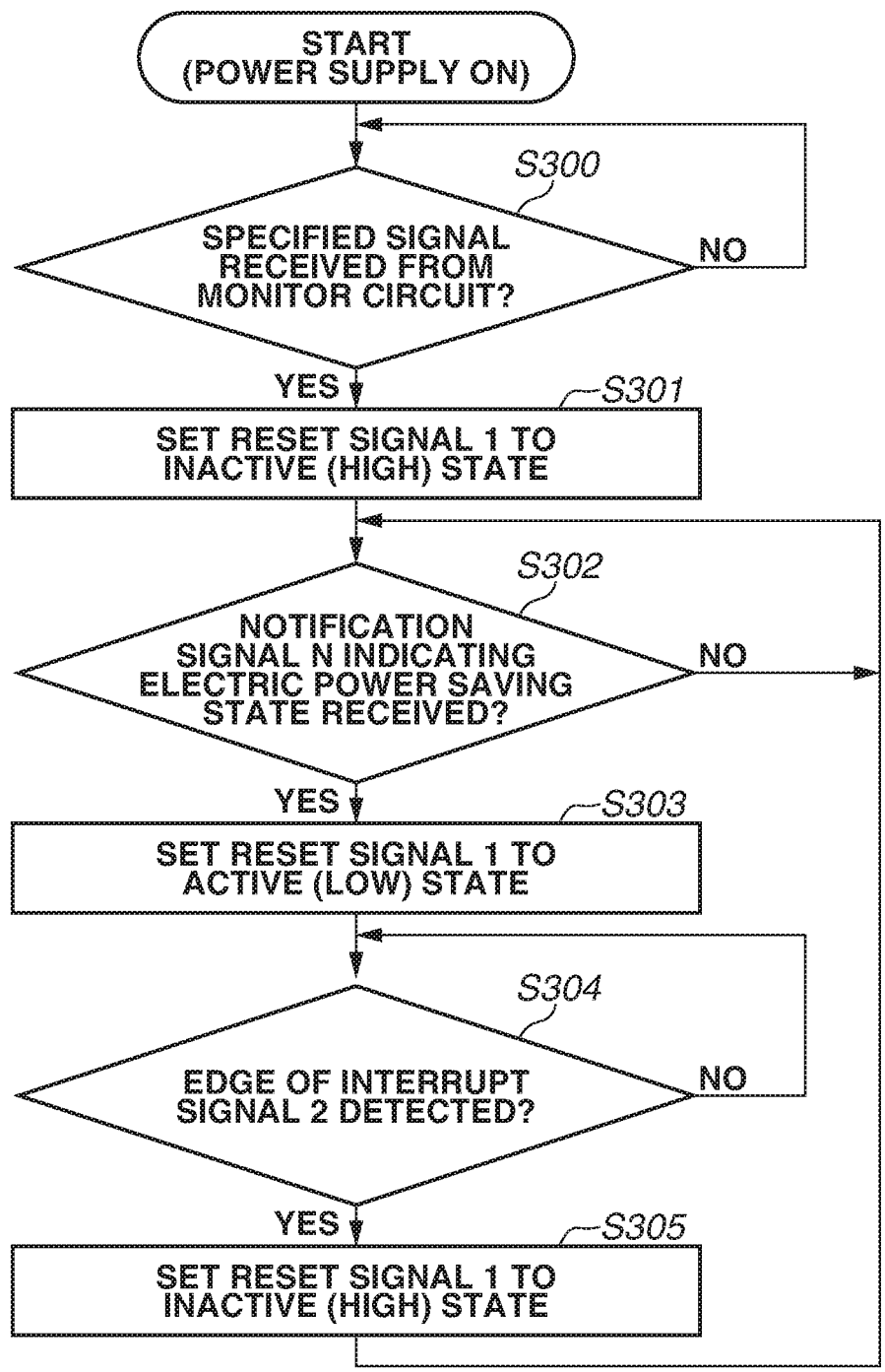
FIG. 7 is a flowchart illustrating processing executed by the hardware sequencer.

FIG. 7 is a flowchart illustrating processing executed by the hardware sequencer 102.

When the power switch SW1 is pressed, the levels of voltage output from the power supplying unit 110 and the power supplying unit 111 gradually rise. If the voltage level exceeds a predetermined value, a monitoring circuit (not illustrated) outputs a predetermined signal. In step S300, it is determined whether the hardware sequencer 102 receives a predetermined signal from the monitoring circuit. If the hardware sequencer 102 receives the predetermined signal from the monitoring circuit (Yes in step S300), then in step S301, the hardware sequencer 102 sets the reset signal 1 to inactive (high). The reset of the CPU 101 is thus canceled, so the CPU 101 is in an operable state.

In step S302, it is determined whether the hardware sequencer 102 receives the notification signal N indicating the electric power saving state from the CPU 101. If the notification signal N indicating the electric power saving state is received from the CPU 101 (Yes in step S302), then in step S303, the hardware sequencer 102 sets the reset signal 1 to active (low), and resets the peripheral devices such as the CPU 101 and the ASIC 106. The peripheral devices that have been reset are in the operation stop state.

In step S304, it is determined whether the hardware sequencer 102 detects the edge of the interrupt signal 2 output from the control logic unit 103. If the hardware sequencer 102 detects the edge of the interrupt signal 2 output from the control logic unit 103 (Yes in step S304), then in step S305, the hardware sequencer 102 sets the reset signal 1 to inactive (high). The reset of the peripheral devices such as the CPU 101 and the ASIC 106 is thus canceled, so that the reset peripheral devices are in an operable state.

Figure 8:
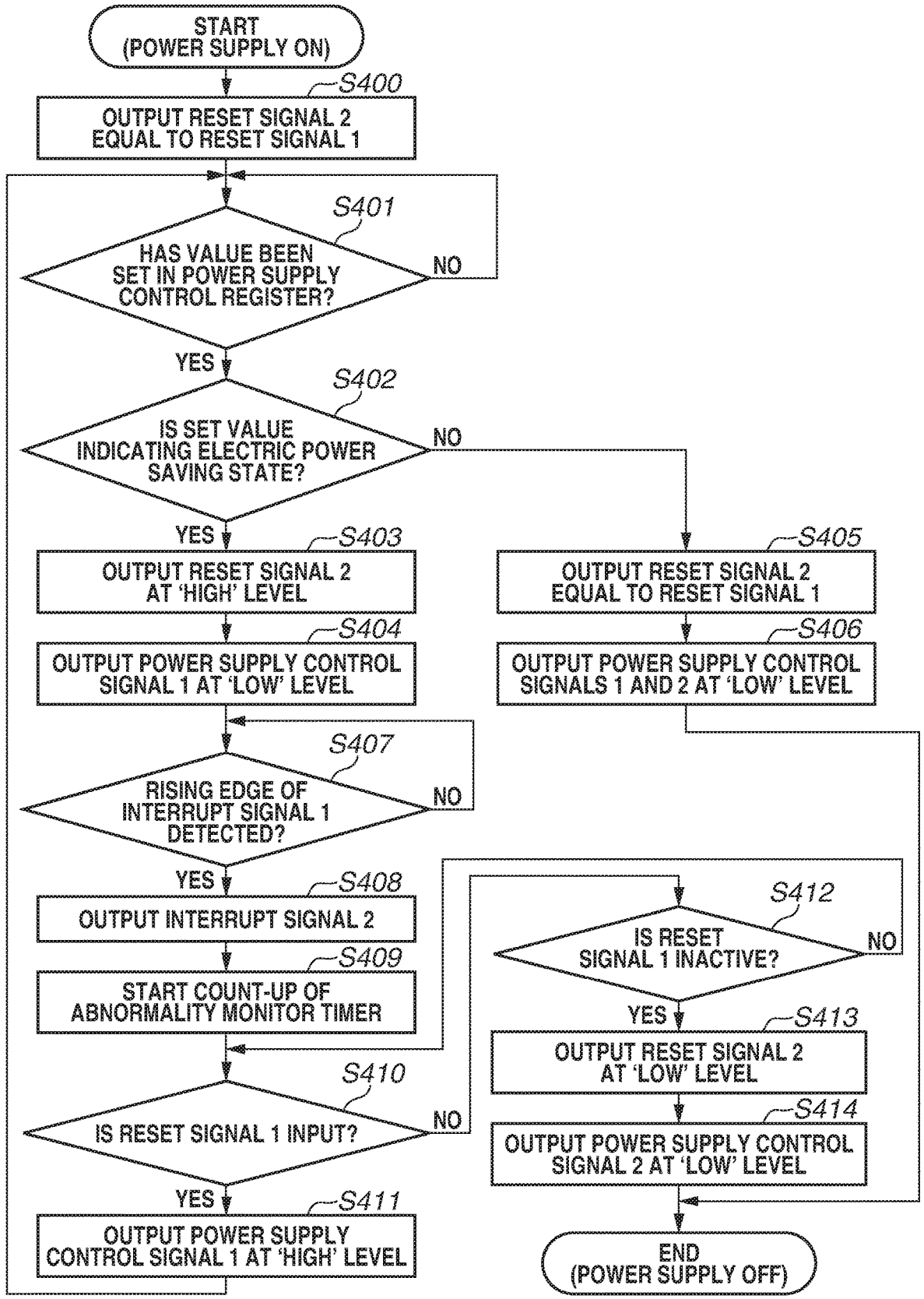
FIG. 8 is a flowchart illustrating the operation of a control logic unit.

FIG. 8 is a flowchart illustrating operation of the control logic unit 103.

In step S400, immediately after the image forming device 100 is started, the control logic unit 103 outputs the reset signal 2 based on the same logic as the reset signal 1 without masking the reset signal 1. In other words, the control logic unit 103 outputs the unchanged reset signal 1 as the reset signal 2.

Thereafter, the control logic unit 103 waits for the CPU 101 to set a value in the power supply control register. In step S401, the control logic unit 103 determines whether the CPU 101 sets a value in the power supply control register. If a value is set in the power supply control register (Yes in step S401), then in step S402, the control logic unit 103 determines whether the value indicates the electric power saving state.

If the result of the determination in step S402 indicates the power saving state (Yes in step S402), the processing proceeds to step S403. In step S403, the control logic unit 103 sets the reset signal 2 to inactive (high). In other words, in step S403, the reset signal 2 is set to the high level regardless of the signal level of the reset signal 1, so that the nonvolatile memory 104 is not reset. In step S404, the control logic unit 103 sets the power supply control signal 1 to the low level, so that the supply of power to the devices (CPU 101, ASIC 106, image creating unit 109, image reading unit 108) from the power supplying unit 111 is stopped.

On the other hand, when the result of the determination in step S402 indicates that power is turned off, the processing proceeds to step S405. In step S405, the control logic unit 103 outputs the reset signal 2 as it is without changing the logic of the reset signal 1. In step S406, the control logic unit 103 sets the power supply control signal 1 and the power supply control signal 2 to the low level to stop the power supply to devices supplied with power from the power supplying unit 110 and the power supplying unit 111. While the power is in turned off, the supply of power to the nonvolatile memory 104 is stopped after the operation of the nonvolatile memory 104 is stopped.

In step S407, after the image forming device 100 shifts to the electric power saving state, the control logic unit 103 waits for input of the interrupt signal 1 output from the network controller IC 107 and determines whether the rising edge of the interrupt signal 1 is detected. If the rising edge of the interrupt signal 1 is detected (Yes in step S407), then in step S408, the control logic unit 103 outputs the interrupt signal 2 in order to cancel the reset of the CPU 101.

The above-described control enables the reset signal 2 not to be input to the nonvolatile memory 104 when the image forming device 100 shifts to the electric power saving state. If the reset signal 2 is not input to the nonvolatile memory 104, the nonvolatile memory 104 can shift to the electric power saving mode where less power is consumed than in the operation stop state.

When the control logic unit 103 outputs the interrupt signal 2 in step S408, then in step S409, a timer for counting a predetermined time is started. In step S410, the control logic unit 103 determines whether the reset signal 1 is input from the hardware sequencer 102. If the reset signal 1 is input (Yes in step S410), then in step S411, the control logic unit 103 sets the power supply control signal 1 to the high level. The power supplying unit 111 can thus supply power to the predetermined devices (CPU 101, ASIC 106, image creating unit 109, and the image reading unit 108).

On the other hand, if the reset signal 1 is not input from the hardware sequencer 102 (No in step S410), then in step S412, the control logic unit 103 determines whether the reset signal 1 input from the hardware sequencer 102 becomes inactive within a predetermined period of time. If the reset signal 1 input from the hardware sequencer 102 becomes inactive, then in step S413, the control logic unit 103 automatically sets the reset signal 2 to active (low). In step S413, the control logic unit 103 sets the power supply control signal 2 to the low level. In this way, the power supply from the power supplying unit 110 to the specified device is stopped. Thereafter, the control logic unit 103 sets the power supply control signal 1 and the power supply control signal 2 to the high level to restart the image forming device 100. At the time of restart, the reset signal 2 is set active, so the nonvolatile memory 104 can execute the startup sequence normally.

Figure 9:
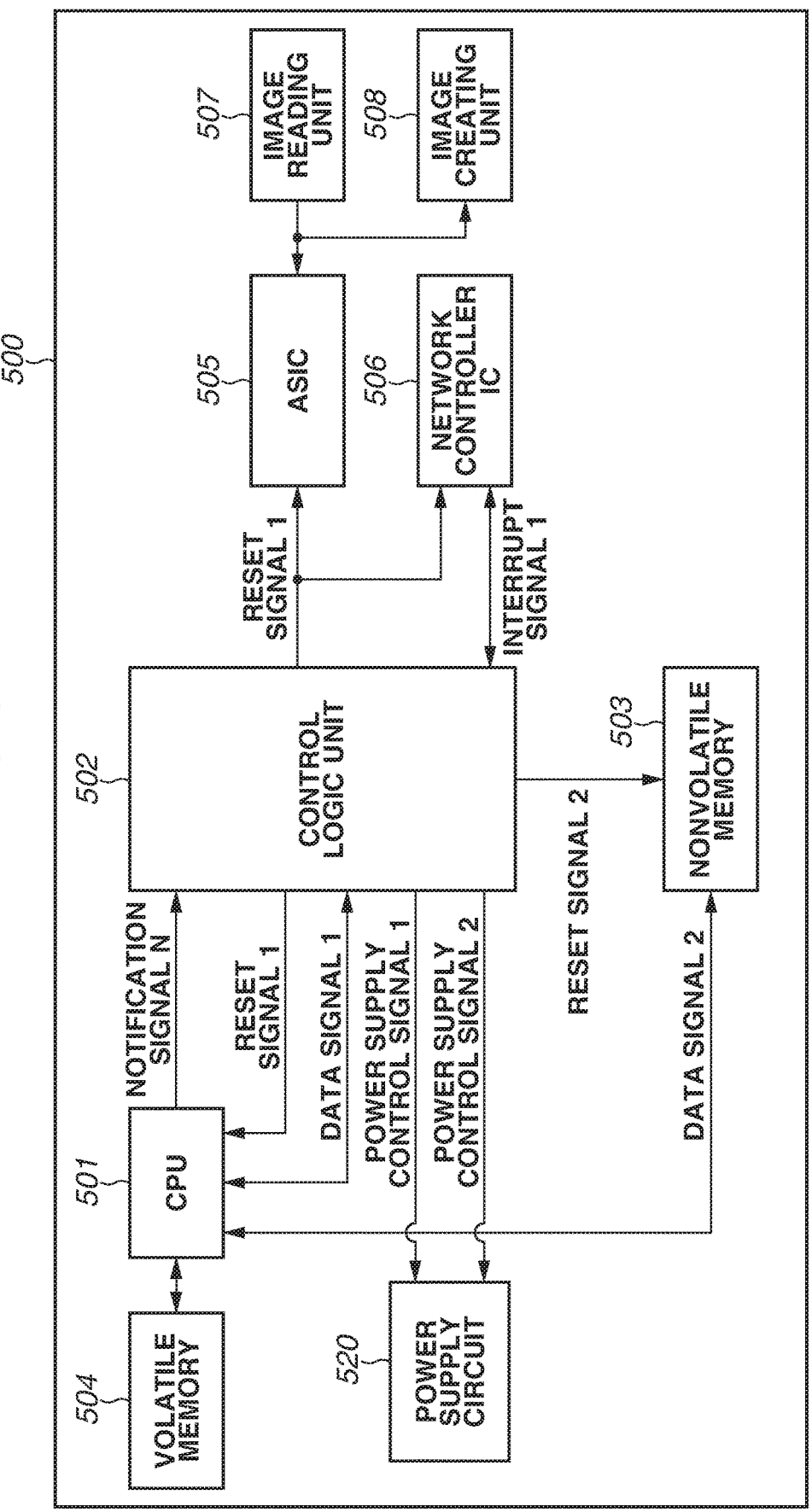
FIG. 9 is a diagram illustrating a hardware configuration of an image forming device according to a second exemplary embodiment.
Figure 10:
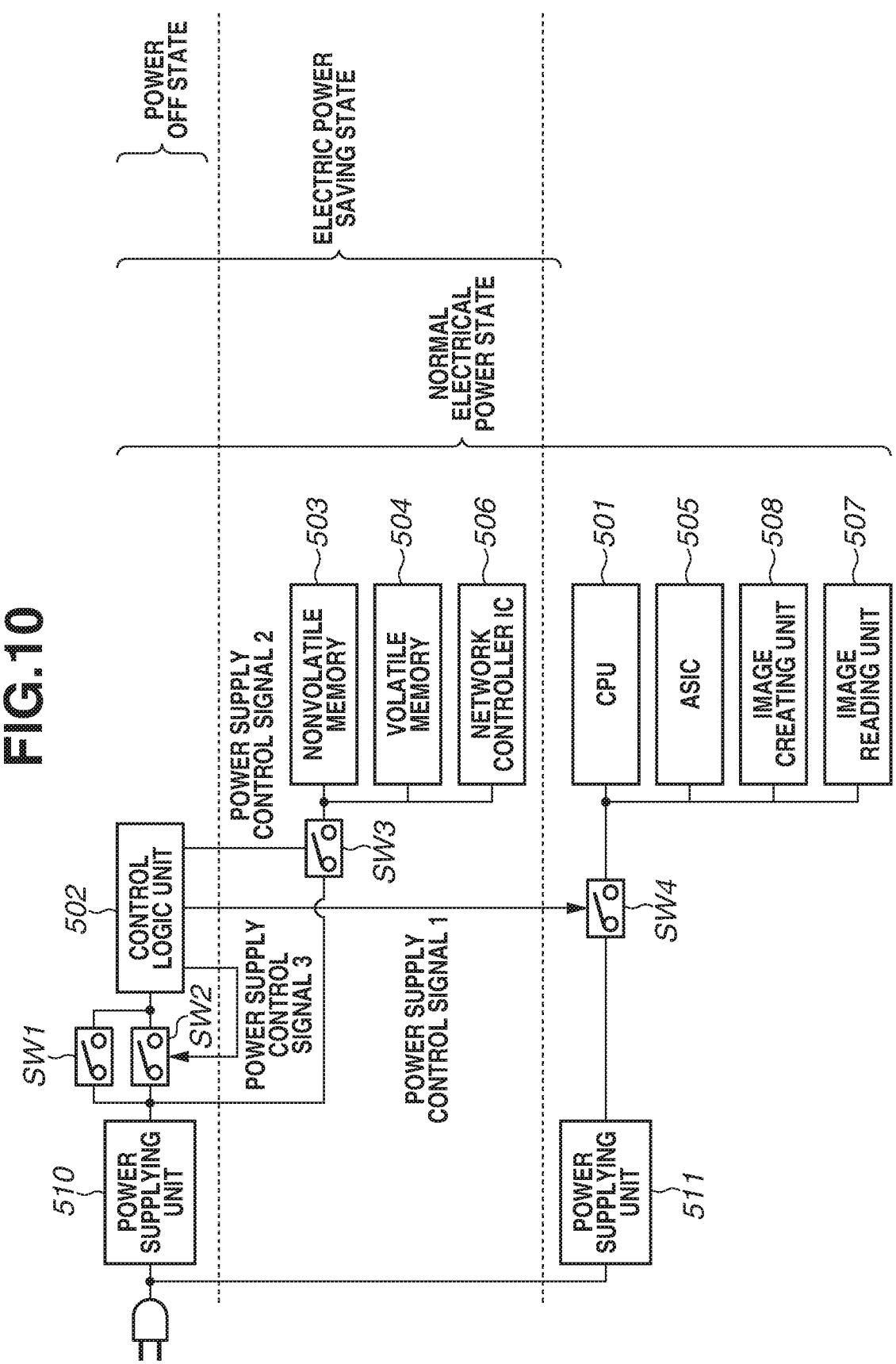
FIG. 10 is a diagram illustrating a power supply system of the image forming device.

A second exemplary embodiment will be described below. FIG. 9 is a diagram illustrating a hardware configuration of an image forming device 500. FIG. 10 is a diagram illustrating a power system of the image forming device 500.

The image forming device 500 includes a CPU 501, a control logic unit 502, a nonvolatile memory 503, a volatile memory 504, an ASIC 505, a network controller IC 506, an image reading unit 507, an image creating unit 508, and a power supply circuit 520. The CPU 501, the nonvolatile memory 503, the volatile memory 504, the ASIC 505, network controller IC 506, the image reading unit 507, the image creating unit 508, and the power supply circuit 520 illustrated in FIG. 9 according to the present exemplary embodiment are identical to those described in the first exemplary embodiment, so the descriptions thereof are omitted. The control logic unit 502 according to the second exemplary embodiment is different from the control logic unit 103 according to the first exemplary embodiment, so that the description thereof will be provided in detail below.

The control logic unit 502 outputs a reset signal 1. The control logic unit 502 sets the reset signal 1 to active (low) when a notification signal N received from the CPU 501 indicates an electric power saving state. The control logic unit 502 also sets the reset signal 1 to active when the notification signal N received from the CPU 501 indicates a power-off state.

Also, the control logic unit 502 outputs a reset signal 2. In other words, the control logic unit 502 outputs both of the reset signal 1 for stopping operation of the CPU 501, the ASIC 505, and the network controller IC 506 and the reset signal 2 for stopping operation of the nonvolatile memory 503.

The control logic unit 502 includes a power supply control register. The CPU 501 sets information indicating the power state that the image forming device 100 is to shifts to, in the power supply control register via a data signal line. The information set in the power supply control register indicates any of a normal electrical power state, the electric power saving state, or a power-off state. The other functions of the control logic unit 502 are the same as the functions of the control logic unit 103 according to the first exemplary embodiment, so that the description thereof is omitted here.

FIG. 10 is a diagram illustrating a power system of the image forming device 500. As illustrated in FIG. 10, a power supplying unit 510 supplies power to the control logic unit 502, the nonvolatile memory 503, the volatile memory 504, and the network controller IC 506. The power supplying unit 510 is an ACDC converter. A power supplying unit 511 supplies power to the CPU 501, the ASIC 505, the image creating unit 508, and the image reading unit 507. The power supplying unit 511 is also an ACDC converter. The control logic unit 502 can change the power state of the image forming device 500 by controlling the supply and the stop of the power that is supplied from the power supplying unit 510 and the power supplying unit 511. When the image forming device 500 is in the normal electrical power state, the control logic unit 502 turns on a switch SW3 and a switch SW4 to supply power to each unit of the image forming device 500. When the image forming device 500 shifts to the electric power saving state, the control logic unit 502 controls the power supply control signal 1 to turn off the switch SW4. In this way, the power supply to the CPU 501, the ASIC 505, the image creating unit 508, and the image reading unit 507 is stopped. When the image forming device 500 shifts to the power-off state, the control logic unit 502 controls the power supply control signal 1 and the power supply control signal 2 to turn off a switch SW2, the switch SW3, and the switch SW4. In this way, the supply of power to the nonvolatile memory 503, the volatile memory 504, the network controller IC 506, the CPU 501, the ASIC 505, the image creating unit 508, and the image reading unit 507 is stopped. Further, when the image forming device 500 shifts to the power-off state, the control logic unit 502 controls the power supply control signal 3 to turn off the switch SW2, and the supply of power to the control logic unit 502 itself is stopped.

When the user turns off the image forming device 500, a power switch SW1 is turned off. Consequently, the CPU 501 executes a termination process such as a shutdown process, and the control logic unit 502 turns off the switch SW2, the switch SW3 and the switch SW4. When the user turns on the image forming device 500, the power switch SW1 is turned on. At this time, the switch SW2 arranged in parallel with the power switch SW1 is also turned on in conjunction with the power switch SW1.

Figure 11:
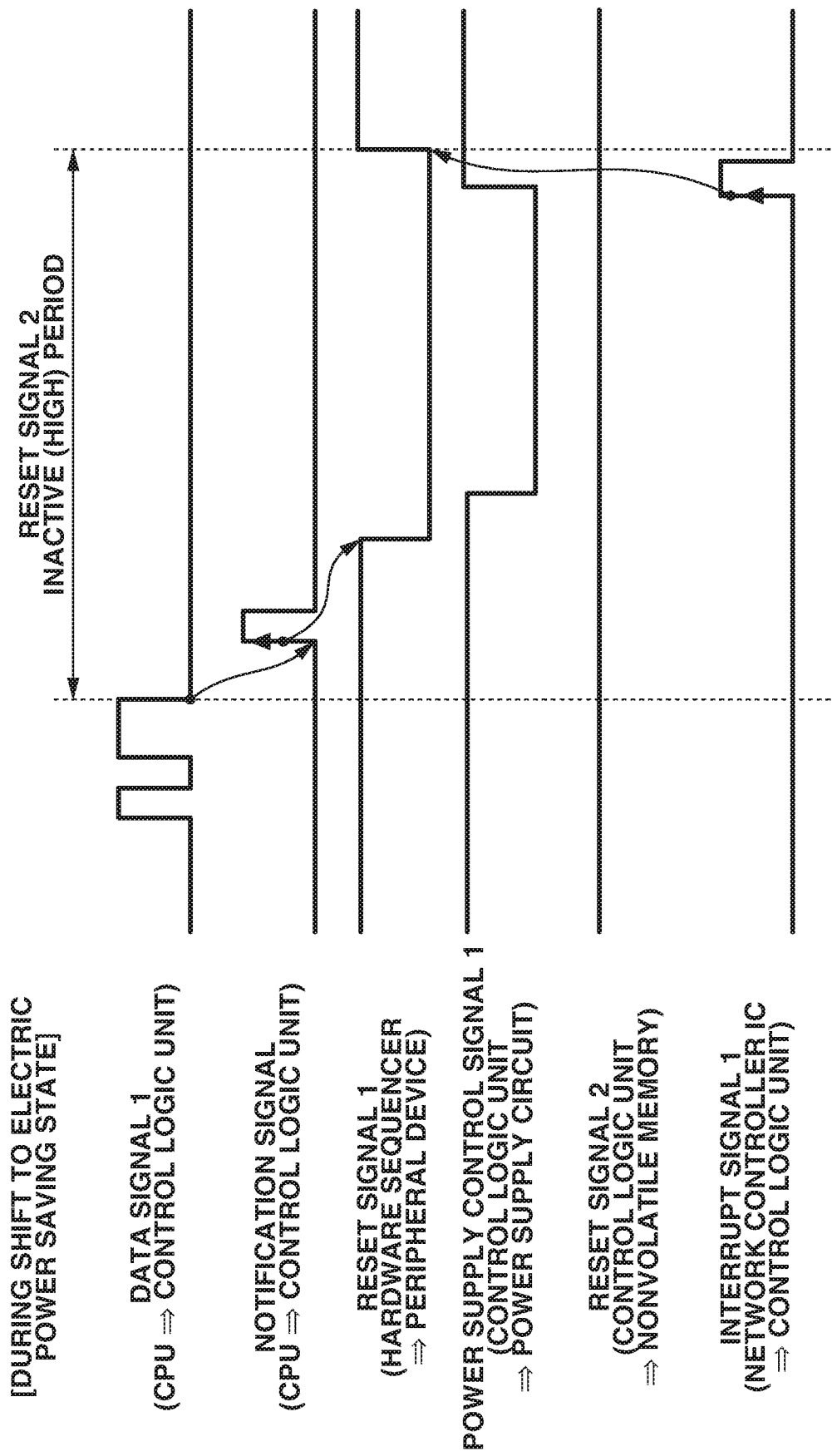
FIG. 11 is a timing chart of each signal when the image forming device shifts to a power-saving state.
Figure 12:
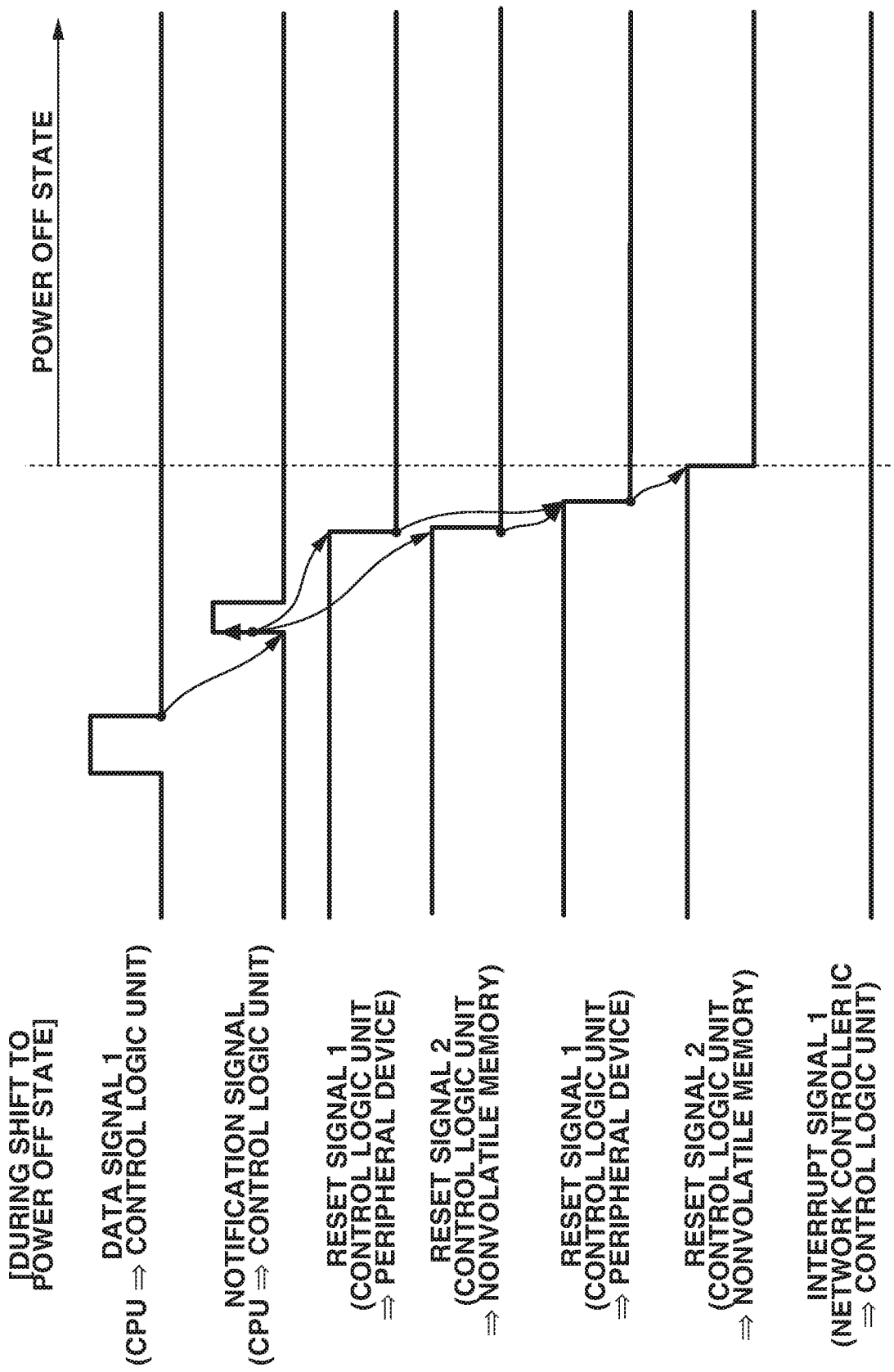
FIG. 12 is a timing chart of each signal when the image forming device shifts to a power-off state.

FIG. 11 illustrates a timing chart of each signal when the image forming device 500 shifts to the electric power saving state. Each signal when the image forming device 500 shifts to the power saving state will be described with reference to FIG. 11. However, the waveforms illustrated in the timing charts of FIGS. 11 and 12 are merely examples, and do not limit the logic of the signal the waveform of the signal, whether the edge trigger or the level trigger, etc.

First of all, the CPU 501 outputs a data signal 1 indicating a power state (electric power saving state) to which the image forming device 500 will shift next. A value indicating the power state indicated by the data signal 1 is set in the power supply control register of the control logic unit 502.

Next, the CPU 501 that outputs the data signal 1, outputs a pulse signal (notification signal N) indicating the electric power saving state to the control logic unit 502.

Upon detection of a rising edge of the notification signal N, the control logic unit 502 sets the reset signal 1 to active (low) in order to reset the peripheral devices. At this time, the control logic unit 502 does not set the reset signal 2 to active since the value in the power supply control register indicates the electric power saving state. In other words, the control logic unit 502 outputs the reset signal 2 based on the value in the power supply control register. In this way, the reset signal 2 input to the nonvolatile memory 503 remains inactive. The reset signal 2 is, thus, not input to the nonvolatile memory 503 when the image forming device 500 is in the electric power saving state. Consequently, the nonvolatile memory 503 shifts to an electric power saving mode (auto power saving mode) where less power is consumed than in an operation stop state. Then, the control logic unit 502 sets the power supply control signal 1 to the low level, and the supply of power to the devices (CPU 501, ASIC 505, image creating unit 508, image reading unit 507) from the power supplying unit 511 is stopped.

When the network controller IC 506 receives a wake-up packet while the image forming device 500 is in the electric power saving state, the network controller IC 506 outputs an interrupt signal 1. The control logic unit 502 sets the reset signal 1 to inactive (high) when the control logic unit 502 detects the rising edge of the interrupt signal 1.

FIG. 12 illustrates a timing chart for each signal when the image forming device 500 shifts to the power-off state. Each signal when the image forming device 500 shifts to the power-off state will be described with reference to FIG. 12.

First, the CPU 501 outputs the data signal 1 indicating the power state (power-off state) to which the image forming device 500 will shift next. A value indicating the power state indicated by the data signal 1 is set in the power supply control register of the control logic unit 502.

Next, the CPU 501 that has output the data signal 1 outputs a pulse signal (notification signal N) indicating the power-off state to the control logic unit 502.

When the control logic unit 502 detects the rising edge of the notification signal N, the control logic unit 502 sets the reset signal 1 to active (low) in order to reset the peripheral devices. Since the value in the power supply control register indicates the power-off state, the control logic unit 502 sets the reset signal 2 to active (low). In other words, the control logic unit 502 outputs the reset signal 2 if the value in the power supply control register indicates the power-off state.

When the reset signal 1 becomes active (low), the control logic unit 502 sequentially sets the power supply control signal 1 and the power supply control signal 2 to the low level to stop the supply of power from the power supplying unit 111 and to stop the supply of power from the power supplying unit 110.

The nonvolatile memory 503 can be reset before the image forming device 500 shifts to the power-off state. The interrupt signal 1 and the interrupt signal 2 are not output in the power-off state.

The above-described control prevents the nonvolatile memory 503 from being reset when the image forming device 500 shifts from the normal electrical power state to the electric power saving state. The nonvolatile memory 503 is then set to the electric power saving mode, and the power consumption is smaller than the power consumption when operation is stopped by the reset.

Figure 13:
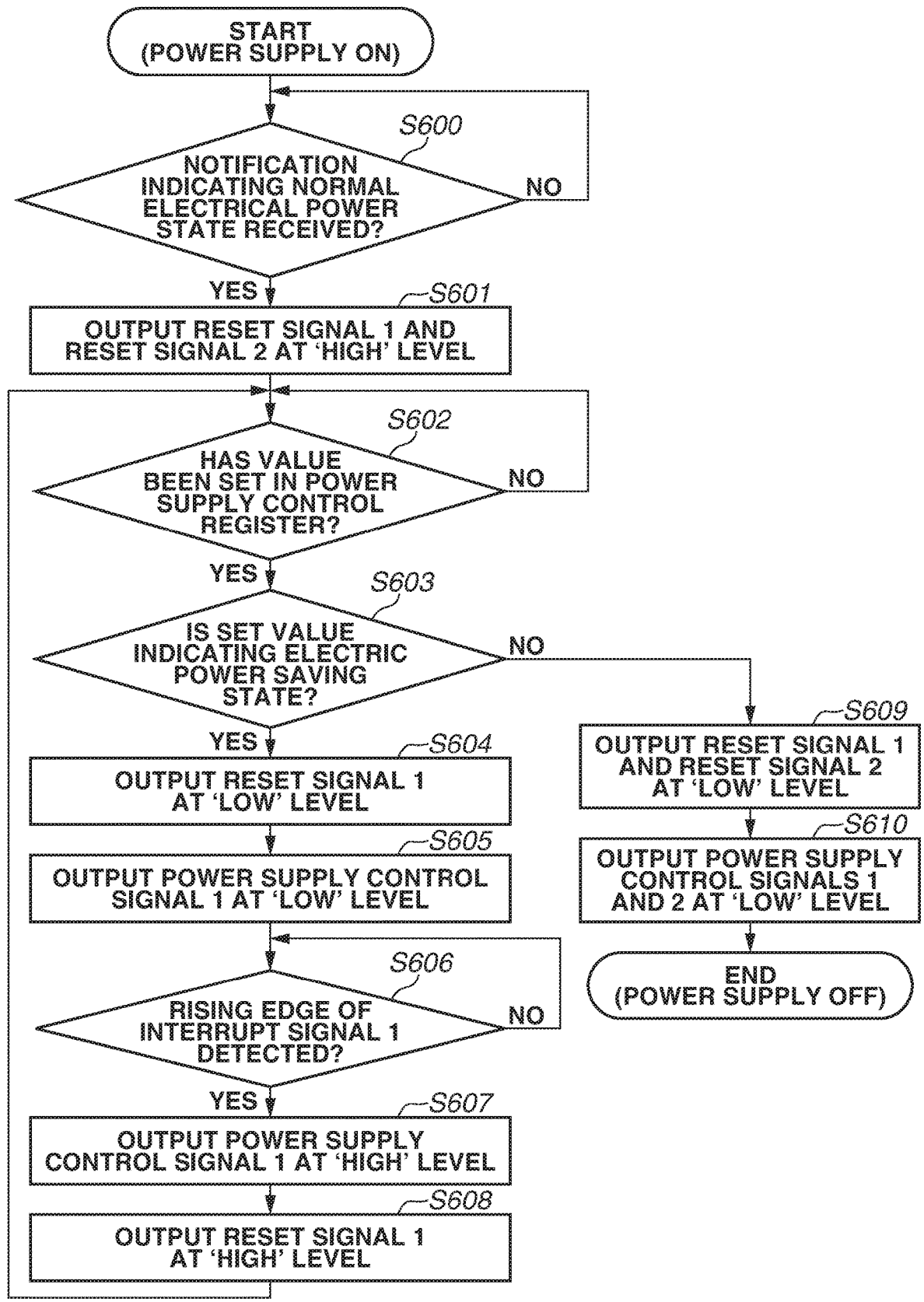
FIG. 13 is a flowchart illustrating operation of a control logic unit.

FIG. 13 is a flowchart illustrating operation of the control logic unit 502 after power is on.

First, in step S600, it is determined whether the control logic unit 502 receives a notification indicating the normal electrical power state from the CPU 501. If the control logic unit 502 receives the notification indicating the normal electrical power state from the CPU 501 (Yes in step S600), the processing proceeds to step S601. In step S601, the control logic unit 502 sets the reset signal 1 and the reset signal 2 to inactive (high). Each device of the image forming device 500 accordingly becomes ready for operation. The processing then proceeds to step S602.

In step S602, the control logic unit 502 determines whether any setting has been made in the power supply control register. If the control logic unit 502 determines that a setting has been made in the power supply control register (Yes in step S602), the processing proceeds to step S603. In step S603, the control logic unit 502 determines whether the content of the setting indicates the electric power saving state.

If the control logic unit 502 determines that, as a result of the determination, the operation state is to be shifted to the power-saving state (Yes in step S603), then in step S604, the control logic unit 502 sets only the reset signal 1 to active (low). The devices included in the image forming device 500 other than the nonvolatile memory 503 are accordingly reset and the operation is stopped. In step S605, the control logic unit 502 sets the power supply control signal 1 to the low level to stop the power supply to some of the devices in the image forming device 500.

In step S603, on the other hand, if the control logic unit 502 determines that, as a result of the determination, that the operation state is to be shifted to the power-off state (No in step S603), the processing proceeds to step S609. In step S609, the control logic unit 502 sets the reset signal 1 and the reset signal 2 to active. The image forming device 500 resets all of the devices. In step S610, the control logic unit 502 sets the power supply control signal 2 to the low level, so that the image forming device 500 is brought into the power-off state.

In step S606, after the power supply control signal 1 is set to the low level, the control logic unit 502 waits for the interrupt signal 1 to be output from the network controller IC 506 and determines whether the rising edge of the interrupt signal 1 is detected. If the control logic unit 502 detects the rising edge of the interrupt signal 1 (Yes in step S606), then in step S607, the control logic unit 502 sets the power supply control signal 1 to the high level. The control logic unit 502 resumes the supply of power that has been stopped in order to restore the image forming device 500 to the normal operation state. In step S608, the control logic unit 502 sets the reset signal 1 to inactive to cancel the reset of the devices other than the nonvolatile memory 503. The processing then returns to step S602.

The above-described control enables the image forming device 500 to shift to the electric power saving mode without resetting the nonvolatile memory 503 only when the image forming device 500 shifts from the normal operation state to the electric power saving state.

Further, in the second exemplary embodiment, the control logic unit 502 may restart the image forming device 500 due to a malfunction in the CPU 501 when the image forming device 500 is in the electric power saving state (when the power supply control register stores information indicating the power saving state). The control logic unit 502, at this time, sets the reset signal 2 to active. The masking of the reset signal 2 to the nonvolatile memory 503 can accordingly be prevented during restarting of the image forming device 500.

OTHER EMBODIMENTS

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-202035, filed Oct. 26, 2018, which is hereby incorporated by reference herein in its entirety.

What is claimed is:

1. An information processing device that has a first power state and a second power state where less power is consumed than in the first power state, the information processing device comprising:

a controller configured to:

transmit a reset signal to a storage device, wherein the storage device is configured to shift a state of the storage device from a normal state to a reset state based on receiving the reset signal, and to shift a state of the storage device from the normal state to an electric power saving state where less power is consumed than in the reset state on a condition that the storage device has received no signal for a predetermined time, and turn off the storage device that has received the reset signal and then has shifted the state of the storage device to the reset state, wherein the controller does not transmit the reset signal to the storage device when the controller shifts a state of the information processing device from the first power state to the second power state so that the storage device shifts the state of the storage device from the normal state to the electric power saving state.

2. The information processing device according to claim 1, wherein the turning off the storage device means stopping power supply to the storage device.

3. The information processing device according to claim 1, further comprising a processor configured to access the device, wherein the storage device shifts a state of the storage device from the normal state to the electric power saving state if the storage device has received no signal on a condition that the storage device has not received the reset signal.

4. The information processing device according to claim 3, wherein the processor outputs information indicating a power state of the information processing device, and wherein the controller provides control to prevent the reset signal from being input to the storage device based on the information indicating the power state of the information processing device output from the processor.

5. The information processing device according to claim 1, wherein the device is an embedded Multi-Media Card.

6. The information processing device according to claim 1, further comprising a printer configured to print an image on a recording medium.

7. The information processing device according to claim 1, further comprising a reader configured to read a document image and to output image data.

8. A control method for an information processing device that has a first power state and a second power state where less power is consumed than in the first power state, and that includes a controller configured to transmit a reset signal to a storage device, wherein the storage device is configured to shift a state of the storage device from a normal state to a reset state based on receiving the reset signal, and to shift a state of the storage device from the normal state to an electric power saving state where less power is consumed than in the reset state on a condition that the storage device has received no signal for a predetermined time, the control method comprising:

turning off the storage device that has received the reset signal and then has shifted the state of the storage device to the reset state, wherein the controller does not transmit the reset signal to the storage device when the controller shifts a state of the information processing device from the first power state to the second power state so that the storage device shifts the state of the storage device from the normal state to the electric power saving state.

9. The control method according to claim 8, wherein the turning off the storage device means stopping power supply to the storage device.

10. The control method according to claim 8, further comprising a processor configured to access the device, wherein the storage device shifts a state of the storage device from the normal state to the electric power saving state if the storage device has received no signal on a conditions that the storage device has not received the reset signal.

11. The information processing device according to claim 1, wherein less power is consumed in the reset state than in the normal state.

* * * * *